United States Patent [19]
Koshiro et al.

[11] Patent Number: 5,504,528
[45] Date of Patent: Apr. 2, 1996

[54] METHOD AND APPARATUS FOR TRANSMITTING A VIDEO SIGNAL, AND APPARATUS FOR RECEIVING A VIDEO SIGNAL

[75] Inventors: Natsuki Koshiro; Tatsuya Ishikawa, both of Yokohama, Japan

[73] Assignee: Kabushiki Kaisha Toshiba, Kawasaki, Japan

[21] Appl. No.: 379,218

[22] Filed: Jan. 27, 1995

Related U.S. Application Data

[63] Continuation of Ser. No. 88,031, Jul. 6, 1993, Pat. No. 5,442,398.

[30] Foreign Application Priority Data

Jul. 6, 1992 [JP] Japan .................... 4-177266

[51] Int. Cl.[6] .................................... H04N 7/12
[52] U.S. Cl. .................................... 348/385; 348/441
[58] Field of Search .................... 348/385, 386, 348/445, 487, 564, 554, 555, 556, 388, 426, 441; 358/86; H04N 7/08, 7/12

[56] References Cited

U.S. PATENT DOCUMENTS

| | | |
|---|---|---|
| 3,256,386 | 1/1963 | Morchand . |
| 3,752,911 | 8/1973 | Morchand et al. . |
| 3,849,594 | 11/1974 | Justice . |
| 3,857,999 | 12/1974 | Justice . |
| 3,953,666 | 4/1976 | Justice et al. . |
| 4,704,629 | 11/1987 | Vreeswijk et al. . |
| 4,862,269 | 8/1989 | Sonoda et al. . |
| 4,967,272 | 10/1990 | Kao et al. . |
| 5,041,909 | 8/1991 | Okano . |
| 5,047,858 | 9/1991 | Aimonoya . |
| 5,055,915 | 10/1991 | Tsinberg . |
| 5,121,205 | 6/1992 | Ng et al. . |
| 5,142,367 | 8/1992 | Hong . |
| 5,161,012 | 11/1992 | Choi . |
| 5,231,494 | 7/1993 | Wachob . |
| 5,325,131 | 6/1994 | Penney .................... 348/556 |
| 5,412,426 | 5/1995 | Totty .................... 348/723 |
| 5,420,641 | 5/1995 | Tsuchida .................... 348/555 |
| 5,430,492 | 7/1995 | Dambacher .................... 348/723 |

FOREIGN PATENT DOCUMENTS

| | | |
|---|---|---|
| 4207688 | 6/1993 | Germany . |
| 4729 | 1/1977 | Japan . |
| 140783 | 11/1981 | Japan . |
| 88491 | 4/1987 | Japan . |
| 1157181 | 6/1989 | Japan . |
| 2260980 | 10/1990 | Japan . |
| 4032386 | 2/1992 | Japan . |
| 2238926 | 6/1991 | United Kingdom . |

OTHER PUBLICATIONS

Stan Baron, "HDTV Production: A Low-Cost . . . " 8012 SMPTE Journal 101(1992) Jan., No. 1 pp. 6–9.

*Primary Examiner*—James J. Groody
*Assistant Examiner*—Chris Grant
*Attorney, Agent, or Firm*—Cushman Darby & Cushman

[57] ABSTRACT

A video transmission apparatus that has a first input terminal for receiving a low-resolution TV signal. The apparatus also has a second input terminal for receiving a high-resolution TV signal and for outputting said high-resolution TV signal. The apparatus converts the low-resolution TV signal into a signal having a format which is equal to that of the high-resolution TV signal. The apparatus selects either the signal, which has been produced by converting low-resolution TV signal into a signal having a format which is equal to that of the high-resolution TV signal, or the high-resolution TV signal, which is outputted from the second input terminal. The signal, which has been produced by converting low-resolution TV signal into a signal having a format which is equal to that of the high-resolution TV signal, is fitted into the high-resolution TV signal. The apparatus encodes the selected signal into a digital high-efficiency coded signal, and outputs a signal indicative thereof. Finally, the apparatus transmits the signal produced by encoding the selected signal.

1 Claim, 4 Drawing Sheets

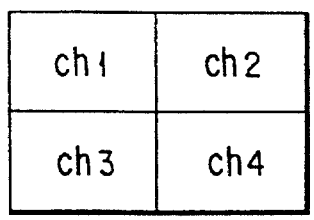
F I G. 3A
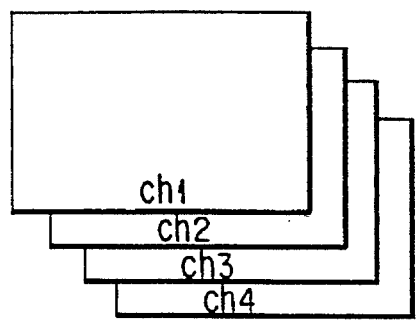
F I G. 3B
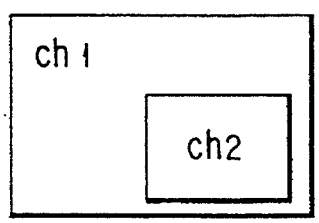
F I G. 3C
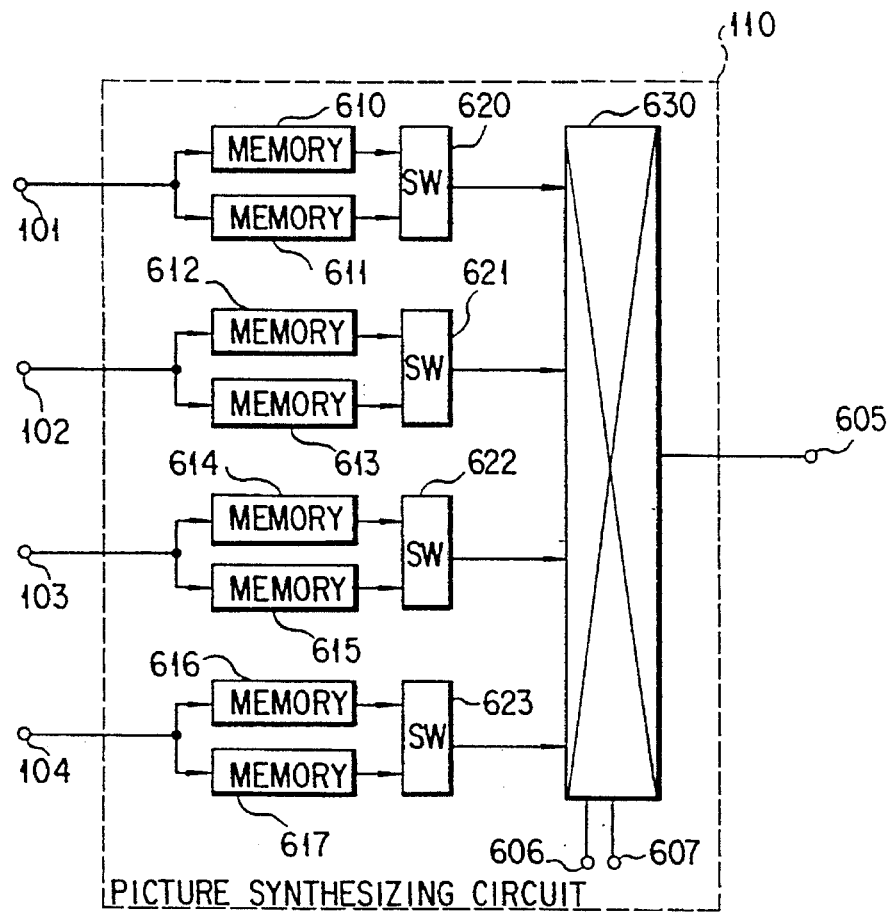
F I G. 4

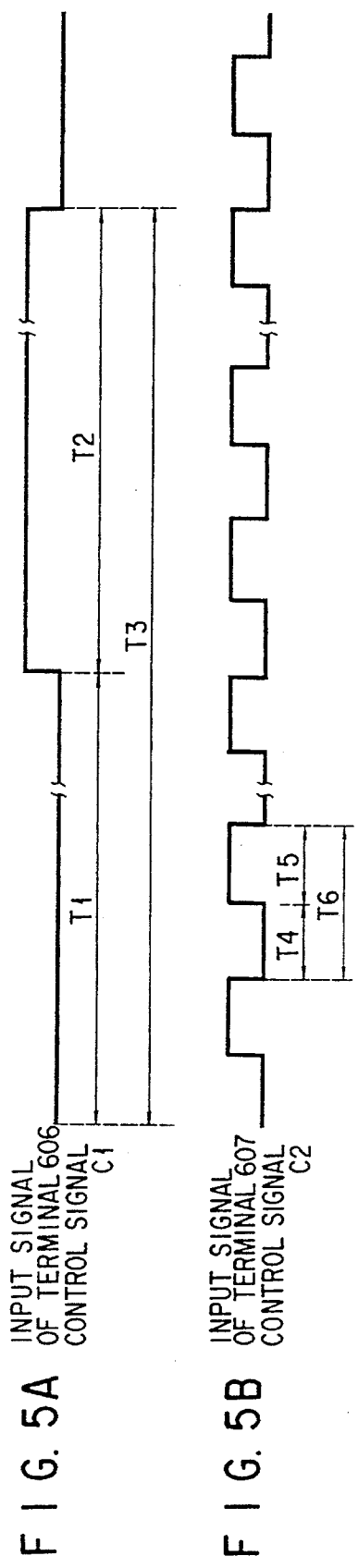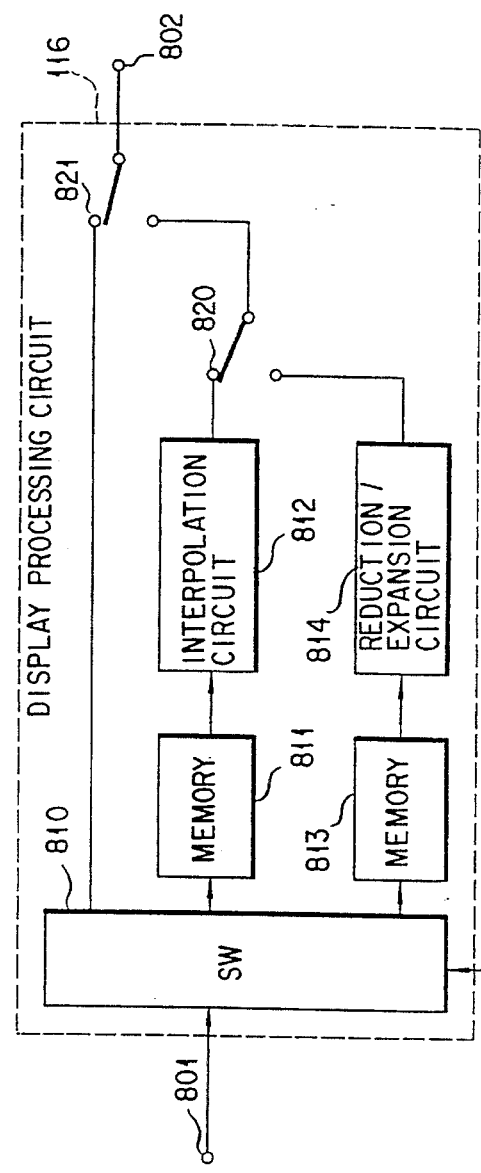

5,504,528

METHOD AND APPARATUS FOR TRANSMITTING A VIDEO SIGNAL, AND APPARATUS FOR RECEIVING A VIDEO SIGNAL

This is a continuation of application Ser. No. 08/088,031 filed Jul. 6, 1993 now U.S. Pat. No. 5,442,398.

BACKGROUND OF THE INVENTION

1. Field of the Invention

The present invention relates to a method for converting a video signal such as a television signal into a digital high-efficiency coded signal and transmitting it, a video signal transmission apparatus for use in the method, and a video signal reception apparatus.

2. Description of the Related Art

In recent years, a system for transmitting and receiving a high-resolution television signal (hereinafter referred to as a high-resolution TV signal) has been developed as a new method for transmitting and receiving a TV signal. The high-resolution TV signal has a larger number of scanning lines than that of scanning lines of a TV signal of the currently-used NTSC system (hereinafter referred to as a low-resolution TV signal), and allows an image to be formed more clearly.

To watch high-resolution television, a high-resolution television set for receiving and demodulating a high-resolution TV signal is needed. Since, however, most of viewers have NTSC television sets, if they replace the NTSC television sets with high-resolution television sets, the NTSC television sets will be useless, as will be program sources of the NTSC system. Therefore, producers of TV programs wish to transmit the low-resolution TV signals as well as the high-resolution TV signals. If, however, a transmission path for the high-resolution TV signal and a transmission path for the low-resolution TV signal are formed separately from each other, it is difficult to assign transmission bands to these transmission paths.

In order to popularize the methods for transmitting and receiving a high-resolution TV signal, television sets, such as HDTV (high definition television) sets and NTSC television sets, that the viewers possess at present, need to be used effectively. Further, it is necessary to devise the methods so as not to make program video sources of the NTSC system useless.

SUMMARY OF THE INVENTION

It is accordingly an object of the present invention to provide a method for transmitting a video signal, a video signal transmission apparatus for use in the method, and a video signal reception apparatus, in which a plurality of low-resolution TV signals can be transmitted with efficiency through a transmission path for a digital high-efficiency coded signal of a high-resolution TV signal, thereby effectively utilizing the transmission path and high-resolution TV sets without making program sources and currently-used low-resolution TV sets useless.

According to a first aspect of the present invention, there is provided a method for transmitting a video signal, comprising:

a step of synthesizing a plurality of low-resolution TV signals input from corresponding input terminals by synthesizing means, and outputting a multichannel low-resolution TV signal whose format is equal to that of a high-resolution TV signal;

a step of converting the multichannel low-resolution TV signal into a digital high-efficiency coded signal by coding means, the multichannel low-resolution TV signal being processed in the same manner as the high-resolution TV signal is; and a step of transmitting the digital high-efficiency coded signal through A transmission path.

According to a second aspect of the present invention, there is provided a video signal transmission apparatus comprising:

input terminals from which a plurality of low-resolution TV signals are input;

synthesizing means for synthesizing the plurality of low-resolution TV signals and outputting a multichannel low-resolution TV signal whose format is equal to that of a high-resolution TV signal;

encoding means for converting the multichannel low-resolution TV signal into a digital high-efficiency coded signal; and transmitting means for transmitting a signal output from the encoding means.

According to a third aspect of the present invention, there is provided a video transmission apparatus comprising:

a first input terminal from which a low-resolution TV signal is input;

a second input terminal from which a high-resolution TV signal is input;

converting means for converting the low-resolution TV signal into a signal having a format which is equal to that of the high-resolution TV signal;

selecting means for fitting the signal output from the converting means into the high-resolution TV signal;

encoding means for converting a signal output from the selecting means into a digital high-efficiency coded signal; and transmitting means for transmitting a signal output from the encoding means.

According to a fourth aspect of the present invention, there is provided a video reception apparatus comprising:

an input terminal supplied with a multichannel low-resolution TV signal generated by synthesizing a plurality of low-resolution TV signals;

decoding means for decoding the multichannel low-resolution TV signal;

display processing means for converting a signal output from the decoding means, which corresponds to one of the plurality of low-resolution TV signals, into a display signal; and display means for displaying a signal output from the display processing means.

In the above method and apparatuses, the transmission path and high-resolution TV sets can be utilized effectively, without making currently-used low-resolution TV program sources useless.

BRIEF DESCRIPTION OF THE DRAWINGS

FIGS. 3A, 3B and 3C are view for explaining an example of a multichannel low-resolution TV signal displayed on a monitor;

FIG. 4 is a block diagram showing an arrangement of the picture synthesizing circuit of the system shown in FIG. 1;

FIGS. 5A, 5B and 5C are timing charts for explaining an operation of the picture synthesizing circuit of the system shown in FIG. 1;

FIG. 6 is a block diagram showing an arrangement of a display processing circuit of the system shown in FIG. 1.

DETAILED DESCRIPTION OF THE PREFERRED EMBODIMENTS

Embodiments of the present invention will now be described, with reference to the accompanying drawings.

Figures 1, 2:
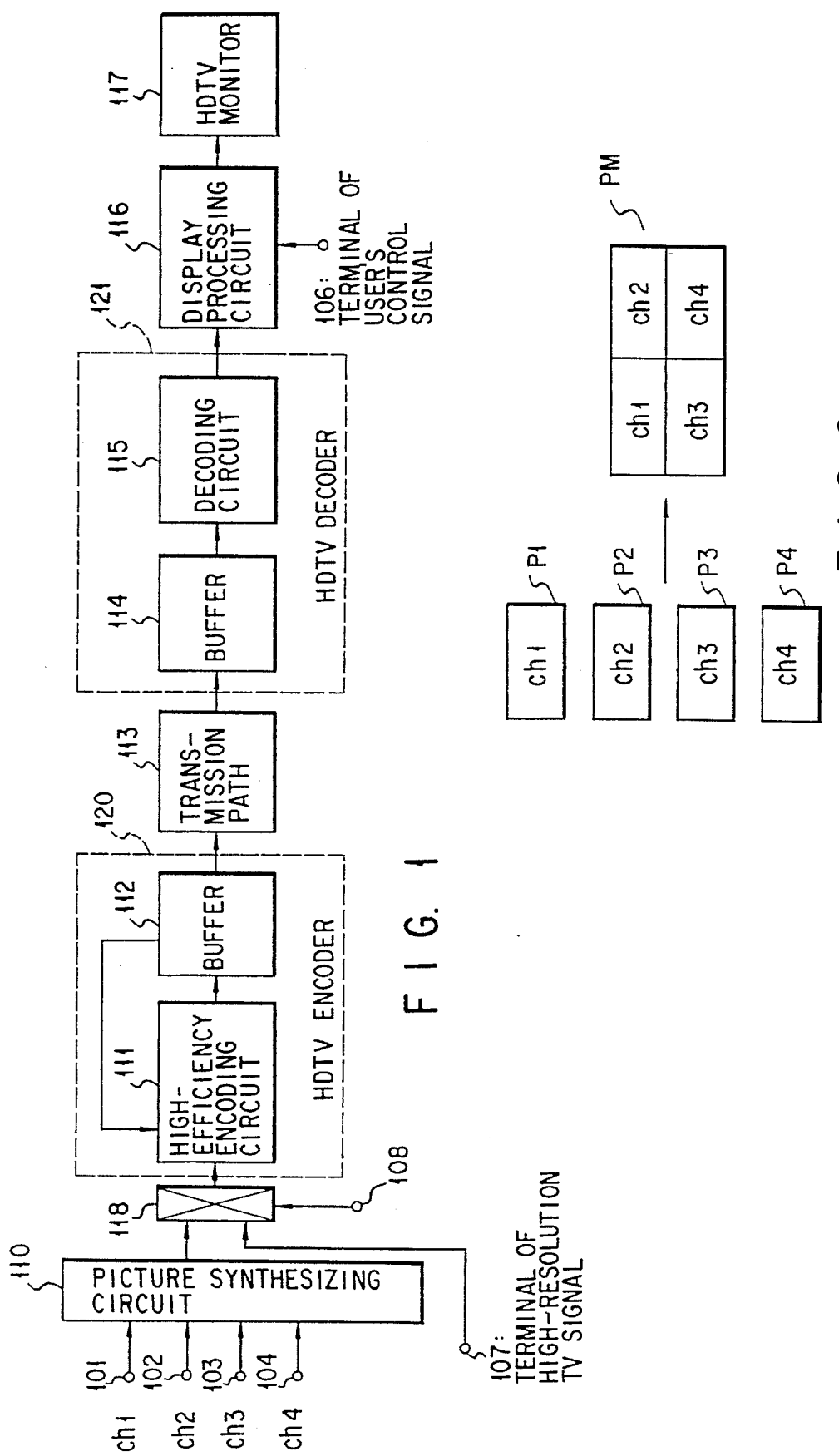
FIG. 1 is a block diagram of a system for transmitting and receiving a video signal according to one embodiment of the present invention.
FIG. 2 is a view for explaining an example of pictures synthesized by a picture synthesizing circuit of the system shown in FIG. 1.

FIG. 1 schematically shows a system for transmitting and receiving a video signal according to one embodiment of the present invention. FIG. 2 shows channels ch1 to ch4 of low-resolution TV signals in order to explain an operation of the system shown in FIG. 1.

In FIG. 1, the low-resolution TV signals of the channels ch1 to ch4 are supplied to their respective terminals 101 to 104. The terminals 101 to 104 are connected to a picture synthesizing circuit 110. Pictures P1 to P4 of the low-resolution TV signals of the channels ch1 to ch4 are synthesized by the picture synthesizing circuit 110 in such a manner that they are fit into a single picture PM as shown in FIG. 2 to generate a multichannel low-resolution TV signal (which is a four-picture signal in FIG. 2). The multichannel low-resolution TV signal is then supplied from the picture synthesizing circuit 110 to one input terminal of a selection circuit 118. The other input terminal of the selection circuit 118 is supplied with a high-resolution TV signal from a terminal 107. The selection circuit 118, which is controlled by a control signal supplied from a control terminal 108, selects a signal from the picture synthesizing circuit 110 or the terminal 107 and supplies the selected signal to a high efficiency encoding circuit 111 included in an HDTV (high definition television) encoder 120. The HDTV encoder 120 also includes a buffer circuit 112 for receiving a signal output from the high efficiency encoding circuit 111.

The high efficiency encoding circuit 111 converts a signal output from the selection circuit 118 into a high-efficiency-encoded signal and supplies it to the buffer circuit 112. The buffer circuit 112 is intended to smooth the encoded signal so as to have a fixed transmission rate and send it to a transmission path 113. When the amount of information of the encoded signal becomes large, the buffer circuit 112 controls the high-efficiency-encoding circuit 111 to reduce the amount.

The signal transmitted through the transmission path 113 is supplied to a buffer circuit 114 arranged in an HDTV decoder 121 and stored therein. A signal having a fixed transmission rate is supplied from the buffer circuit 114 to a decoding circuit 115 and decoded therein. The decoded signal is supplied to a display processing circuit 116.

When the display processing circuit 116 detects that the signal decoded by the decoding circuit 115 is a high-resolution TV signal, it supplies the decoded signal to an HDTV monitor 117 as it is. When the display processing circuit 116 detects that the decoded signal is a multichannel low-resolution TV signal, it processes an image in response to a control signal supplied to a terminal 106 from a user.

FIGS. 3A and 3B show examples of display pictures formed in accordance with a processing mode of the display processing circuit 116. FIG. 3A shows a display of four pictures synthesized by the picture synthesizing circuit 110, FIG. 3B shows a display of an enlarged one of the four pictures synthesized on the transmission side, and FIG. 3C shows a display of a main picture (master picture) obtained by enlarging one of the four pictures synthesized on the transmission side and a sub-picture (slave picture) corresponding to another one of the four pictures.

An operation of the picture synthesizing circuit 110 will be described, with reference to FIGS. 4 and 5A to 5C.

In FIG. 4, low-resolution TV signals of channels ch1 and ch4 are supplied to the terminals 101 to 104. The signal from the terminal 101 is supplied to memories 610 and 611, the signal from the terminal 102 is supplied to memories 612 and 613, the signal from the terminal 103 is supplied to memories 614 and 615, and the signal from the terminal 104 is supplied to memories 616 and 617. The memories 610 and 611 are controlled alternately by a control circuit (not shown) that one of them is set in a write mode and the other is set in a read mode. Similarly, the memories 612 and 613 are controlled alternately by the control circuit, as are the memories 614 and 615 and the memories 616 and 617. An input signal is written to the memories in the write mode, and a stored signal is read out from the memories in the read mode. The outputs of the memories 610 and 611 are supplied to a switch 620, the outputs of the memories 612 and 613 are supplied to a switch 621, the outputs of the memories 614 and 615 are supplied to a switch 622, and the outputs of the memories 616 and 617 are supplied to a switch 623. These switches 620 to 623 are controlled by a control circuit (not shown) so that a signal is selectively read out from the memories in the read mode. The read speed is faster than the write speed, and a picture corresponding to the read-out signal is reduced to, for example, ¼ of a picture corresponding to the input signal. The output signals from the switches 620 to 623 are transmitted to a selecting circuit 630.

In the picture synthesizing circuit 110, the data writing frequency of each of the memories is, for example, 13.5 MHz, and the data reading frequency thereof is, for example, 54.0 MHz.

FIG. 5 are timing charts for explaining an operation of the selecting circuit 630. The selecting circuit 630 is supplied with control signals C1 and C2 from a control circuit (not shown) through terminals 606 and 607. The terminals 606 and 607 are supplied with control signals C1 and C2 shown in FIGS. 5A and 5B, respectively. In FIG. 5B, T4 and T5 each represent a one-line period of a low-resolution TV signal, and T6 represents a period of the sum of periods T4 and T5 which is a one-line period of the multichannel low-resolution TV signal shown in FIG. 2 (a picture PM). In FIG. 5A, T1 and T2 each represent a ½ vertical period of the multichannel low-resolution TV signal shown in FIG. 2 (a picture PM), and T3 represents one vertical period (one-frame period) of the multichannel resolution-low TV signal shown in FIG. 2. The selecting circuit 630 selectively outputs the signals from the switches 620 and 621 during the period T1, and outputs the signal from the switch 620 during the period T4 and the signal from the switch 621 during the period T5. Further, the selecting circuit 630 selectively outputs the signals from the switches 622 and 623 during the period T2, and outputs the signal from the switch 622 during the period T4 and the signal from the switch 623 during the period T5. As a result, channel signals are output from an output terminal 605 of the selecting circuit 630 in the sequence shown in FIG. 5C. More specifically, signals of channels ch1 and ch2 are output alternately for each line during the period T1 in which the control signal C1 is at a low level, and signals of channels ch3 and ch4 are output alternately for each line during the period T2 in which the control signal C1 is at a high level, with the result that a picture of the multichannel low-resolution TV signal includes pictures of the channels ch1 and ch2 arranged on the upper side and those of the Channels ch3 and ch4 arranged on the lower side. More specifically, in the picture synthesizing circuit 110, the same lines of a plurality of low-resolution TV signals are sampled in sequence to generate a signal corresponding to one line of a high-resolution TV signal, with the result that the low-resolution TV signals are synthesized into a multichannel low-resolution TV signal.

The multichannel low-resolution TV signal is the same as the high-resolution TV signal in line frequency, vertical frequency, and the like. Therefore, like the high-resolution TV signal, the multichannel low-resolution TV signal can be encoded and decoded.

The multichannel low-resolution TV signal output from the terminal 605 is high-efficiently encoded by the high-efficient encoding circuit 111. If, when the picture signals of the four channels are high-efficiently encoded, the amount of information of a picture signal of one of the channels is increased and the amount of information of picture signals of the other channels is decreased, the total amount of information is not decreased, and the encoded signals can be transmitted without degrading the image quality of the picture signal of the channel having a large amount of information.

In a low-resolution TV signal transmission mode, the signal output from the picture synthesizing circuit 110 is input to the HDTV encoder 120 through the selecting circuit 118. In a high-resolution TV signal transmission mode, the high-resolution TV signal supplied from the input terminal 107 is selected by the selecting circuit 118 and then supplied to the HDTV encoder 120. During the selection of the high-resolution TV signal, the selecting circuit 118 is able to select one of the low-resolution TV signals to produce a video signal representing a picture of the selected low-resolution TV signal which is fit into a picture of the high-resolution TV signal and, in this case, a control signal is supplied from a timing control circuit (not shown) to the control terminal 108 of the selecting circuit 118. Assuming that a picture of the low-resolution TV signal of channel ch1 is fit into a picture of the high-resolution TV signal, the memories 610 and 611 and switches 620 and 630 in the picture synthesizing circuit 110 operate as converting means for converting the low-resolution TV signal so that it can be fit into part of the picture of the high-resolution TV signal. This operation is substantially the same as the above-described picture synthesizing operation. Therefore, one low-resolution TV signal output from the switch 620 is selected by the selecting circuit 630 and then supplied to the selecting circuit 118.

FIG. 6 specifically shows the display processing circuit 116. Assume that a plurality of low-resolution TV signals are decoded by the decoding circuit 115 of the HDTV decoder 121. The signals output from the decoding circuit 115 in FIG. 1 are supplied to an input terminal 801 and then a switch 810. When the low-resolution TV signals are supplied, the switch 810 directly guides the signals from the input terminal 801 to a switch 821 in response to a control signal (mode selection signal) from the terminal 106, or supplies it to a memory 811 or a memory 813. When the display mode shown in FIG. 3A is selected in response to the control signal from the terminal 106, the signal of the input terminal 801 is supplied to the switch 821 as it is, and the switch 821 guides the input signal to an output terminal 802.

When the display mode shown in FIG. 3B is selected, the switch 810 supplies one of four picture signals of the input terminal 801 to the memory 811 in response to the control signal inputted from the input terminal 106. The memory 811 receives the picture signal under control of a write control circuit (not shown). The output signal of the memory 811 is supplied to an interpolation circuit 812. The interpolation circuit 812 interpolates the scanning lines of the signal supplied from the memory 811 in order to convert it into a signal to be displayed on a high-resolution display. The output of the interpolation circuit 812 is supplied to the output terminal 802 through the switches 820 and 821.

when the display mode shown in FIG. 3C is selected, one of four picture signals of the input terminal 801, which is designated as a master picture, is written to the memory 811, and another one of the picture signals, which is designated as a slave picture, is written to the memory 813. The output signal of the memory 811 is input to the interpolation circuit 812. The data writing frequency of each of the memories 811 and 813 is 54 MHz, and the data reading frequency thereof is also 54 MHz. The interpolation circuit 812 interpolates the scanning lines of the signal in order to convert it into a master picture signal. The output signal of the memory 813 is supplied to a reduction/expansion circuit 814 and reduced/expanded in the time basis direction in order to convert it into a slave picture signal. The switch 820 selects the output signal of the reduction/expansion circuit 814 during a period corresponding to the slave picture, and selects the output signal of the interpolation circuit 812 during a period corresponding to the master picture. The output signal of the switch 820 is transmitted to the output terminal 802 through the switch 821. The write clocks of the memories 811 and 813 are synchronized with each other by a timing control circuit (not shown), as are the read clocks thereof, and the read start timing is controlled in order to determine display positions of the master and slave pictures. Furthermore, the switch 820 is controlled by the timing control circuit.

When the high-resolution TV signal is decoded, the signal of the input terminal 801 is supplied to the output terminal 802 through the switches 810 and 821.

In the system of the above embodiment, a plurality of low-resolution TV signals can be synthesized and the synthesized signal can be transmitted as a multichannel low-resolution TV signal from the transmission side, and the multichannel low-resolution TV signal can be processed and displayed in an arbitrary mode on the reception side. This system can be applied to a system for transmitting and receiving a high-resolution TV signal. More specifically, since a plurality of low-resolution TV signals can be transmitted efficiently through a transmission path for a digital high-efficiency coded signal into which the high-resolution TV signal is converted, the transmission path and high-resolution television sets can be used effectively, and program sources of the NTSC system recorded on magnetic tapes or the like can be prevented from being made useless.

Figure 7:
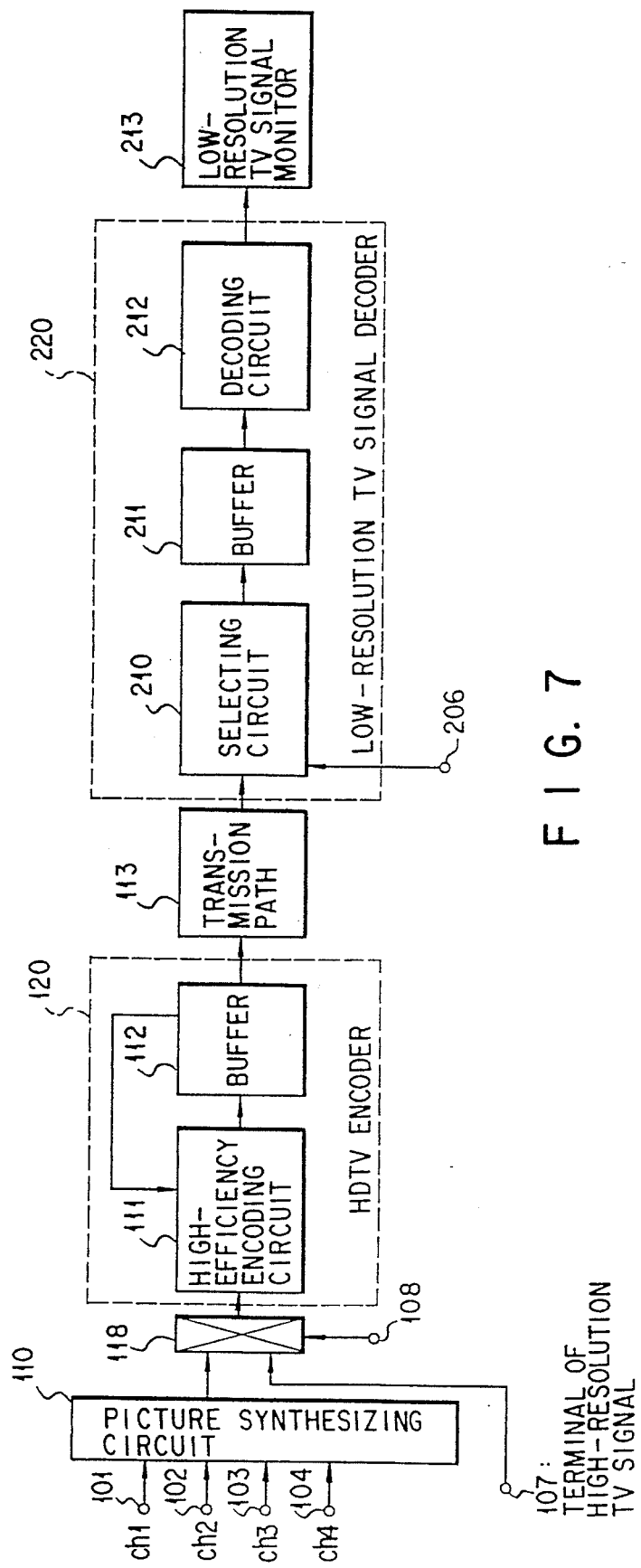
FIG. 7 is a block diagram of a system for transmitting and receiving a video signal according to another embodiment of the present invention.

FIG. 7 is a block diagram showing a system for transmitting and receiving video signal according to another embodiment of the present invention. This embodiment is intended to offer a convenience to a user having a low-resolution TV signal monitor 213. In FIG. 7, the descriptions of the elements denoted by the same numerals as those in FIG. 1 are omitted. When the low-resolution TV signals of channels ch1 to ch4 are supplied to terminals 101 to 104, respectively, a high-efficiently encoded multichannel low-resolution TV signal is supplied to a selecting circuit 210 through a transmission path 113 at a fixed transmission rate. The selecting circuit 210 selects one picture signal from the multichannel low-resolution TV signal in response to a user's control signal from a control terminal 206. The output signal of the selecting circuit 210 is supplied to a buffer circuit 211. The buffer circuit 211 stores a signal supplied from the selecting circuit 210 and then supply it to a decoding circuit 212. A picture signal is supplied from the decoding circuit 212 to the low-resolution TV monitor 213.

What is claimed is:

1. A video transmission apparatus comprising:

a first input terminal for receiving a plurality of low-resolution TV signals;

a second input terminal for receiving a high-resolution TV signal;

converting means for converting said plurality of low-resolution TV signals into a time-divisionally multiplexed signal having a format which is equal to that of said high-resolution TV signal, and for outputting said time-divisionally multiplexed signal;

means for producing a new high-resolution TV signal by combining said time-divisionally multiplexed signal with said high-resolution TV signal;

encoding means for converting said new high-resolution TV signal into a digital high-efficiency coded signal, and for outputting said digital high-efficiency coded signal; and transmitting means for transmitting said digital high-efficiency coded signal.

\* \* \* \* \*